Dec. 7, 1965  A. R. HALLDEN  3,222,666
STROBOSCOPIC READOUT OF DISPLAY TAPE
Original Filed Feb. 6, 1959  5 Sheets-Sheet 1

Dec. 7, 1965    A. R. HALLDEN    3,222,666
STROBOSCOPIC READOUT OF DISPLAY TAPE
Original Filed Feb. 6, 1959    5 Sheets-Sheet 2

United States Patent Office 3,222,666
Patented Dec. 7, 1965

3,222,666
STROBOSCOPIC READOUT OF DISPLAY TAPE
Andrew R. Hallden, Baldwin, N.Y., assignor to Hazeltine Research, Inc., Chicago, Ill., a corporation of Illinois
Continuation of application Ser. No. 791,651, Feb. 6, 1959. This application Apr. 6, 1961, Ser. No. 103,674
5 Claims. (Cl. 340—324)

This invention relates to a readout device that may be used with a computer. While the specification will describe the invention in such an environment, it will be apparent that its scope is not limited to computers.

This application is a continuation of application Serial No. 791,651, filed February 6, 1959, now abandoned, and entitled "Readout Device."

A readout device is a piece of equipment which provides a viewer with a visual indication of a quantity or state which the viewer could not ordinarily determine. More particularly, this invention is capable of taking a binary or decimal number in the form of an electrical signal from a computer and furnishing a visual indication of the number as it would normally be written or read.

While many readout devices presently exist, they are subject to a number of limitations and drawbacks. Some of these limitations are: the maximum number of characters that can be handled is low; the need for binary-to-decimal conversion; and the speed of readout is slow. Some of the drawbacks are expense, size, and short life.

The specification will describe three embodiments of the present invention, all three embodiments being based upon the same principles. The first two embodiments differ only in the type of member which carries the characters to be viewed. Both of these embodiments provide the viewer with a visual indication of an electrical signal which is equivalent to a binary or binary-coded decimal number. The third embodiment differs from the first two in that this embodiment provides the viewer with visual indication of an electrical signal which is equivalent to a decimal number.

It is an object of the present invention to provide a new and improved readout device that is capable of taking a binary, binary-coded decimal, or decimal number in the form of an electrical signal and furnishing a visual indication of this signal as it would normally be written.

It is another object of this invention to provide a new and improved readout device that is not subject to the above-mentioned limitations.

In accordance with the present invention the readout device comprises circuit means for supplying a first signal representative of a particular character and a cyclically moving member having displayable characters and code information associated with each character. The invention also includes means for developing code signals representative of the code information and circuit means responsive jointly to the first signal and the code signals for developing a control signal whenever a particular code signal is representative of code information associated with the same character as is the first signal. Additionally, the readout device includes means responsive to the control signal for displaying the particular character on the member represented by the first signal and the code signal.

For a better understanding of the present invention, together with other and further objects thereof, reference is had to the following description, taken in connection with the accompanying drawings, and its scope will be pointed out in the appended claims.

Referring to the drawings.

Figure 1A:
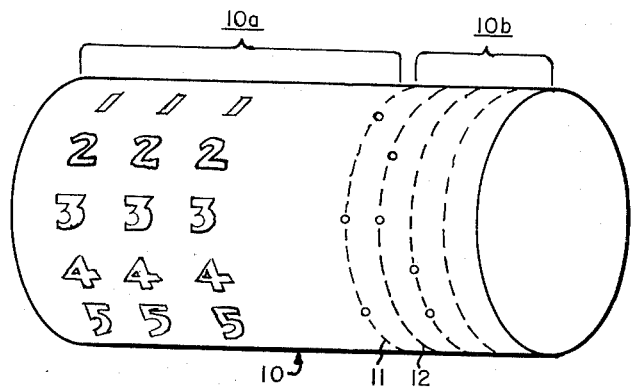
FIG. 1a is a perspective view of a drum-shaped member which carries the characters to be viewed and the code information.

DESCRIPTION OF DRUM OF FIG. 1a

FIG. 1a shows a perspective view of a cyclically moving drum 10 which carries the characters to be viewed and the corresponding code information. Drum 10 is almost entirely opaque. Portion 10a of the drum has cleared transparent portions corresponding to the characters which are to be viewed. Portion 10b has cleared transparent portions corresponding to the code information. FIG. 1a shows that each row of characters has associated with it a particular code determined by the number of cleared transparent portions and the relative spacing and positioning of these clear transparent portions. As will be explained below, the spacing and positioning of the code information is used to develop electrical signals in binary form representative of the associated character. For instance the row of 1's has one cleared portion positioned on track 11, and the row of 3's has one cleared portion on track 11 and another cleared portion on track 12.

Figure 1B:
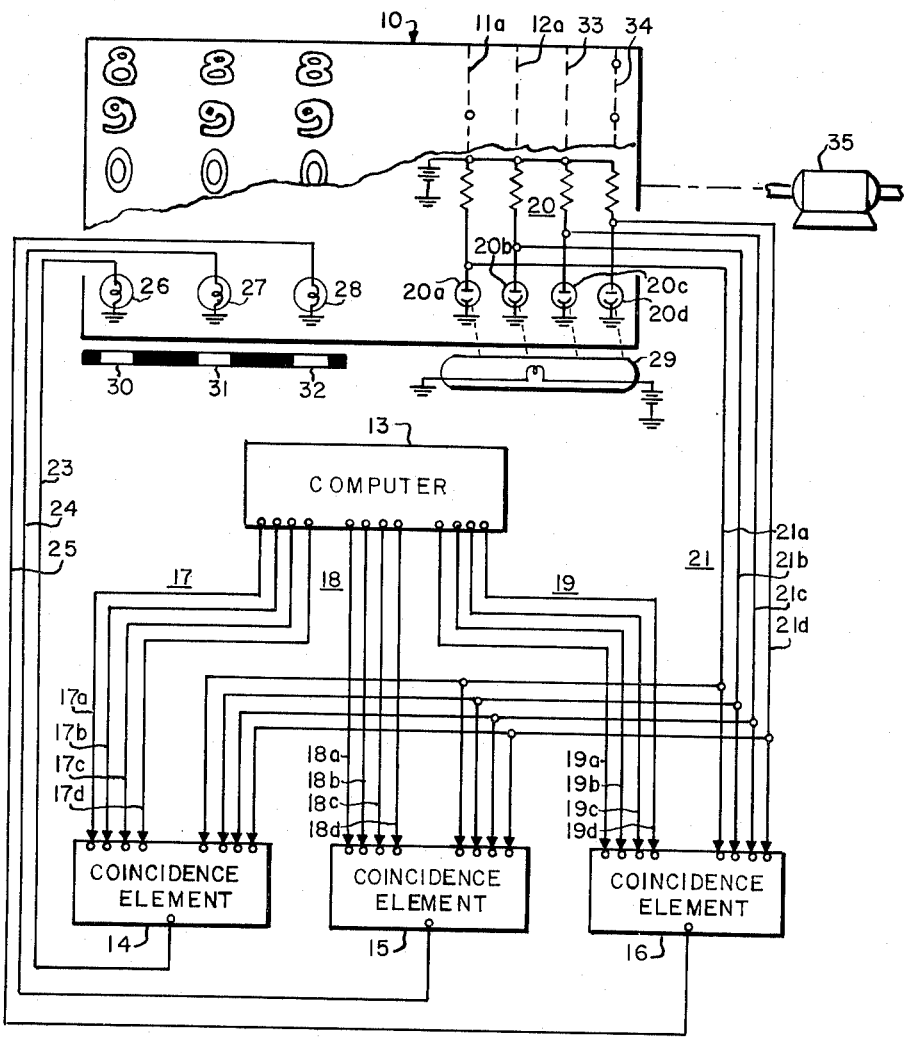
FIG. 1b is a schematic diagram showing the FIG. 1a drum and its associated circuitry.

DESCRIPTION OF DRUM OF FIG. 1b AND ITS ASSOCIATED CIRCUITRY

FIG. 1b is a schematic diagram showing the top view of the FIG. 1a drum and its associated circuitry. Element 13 continuously furnishes binary-coded decimal input signals to coincidence elements 14, 15, and 16 along lines 17, 18, and 19, respectively. The drum 10 is similar to the one described in FIG. 1a. A portion of the drum surface has been cut away so that elements interior to the drum may be seen. A motor 35 causes drum 10 to continuously rotate at a high speed. A light source 29 is positioned near that portion of the drum which carries the code information and is exterior to the drum. Detection means 20 are located interior to the drum and opposite the light source 29. The detection means are composed of four individual light sensitive letectors 20a, 20b, 20c, and 20d. Each code track has associated with it an individual detector. The detection means 20 are coupled to each of the coincidence elements 14, 15, and 16 along lines 21. Coincidence elements 14, 15, and 16 are coupled through lines 23, 24, and 25, respectively, to illuminating means 26, 27, and 28, respectively. These illuminating means are located near that portion of the drum which carries the characters to be viewed and are interior to the drum. Viewing windows 30, 31, and 32 are located exterior to the drum and opposite the illuminating means 26, 27, and 28, respectively.

OPERATION OF DRUM OF FIG. 1b AND ITS ASSOCIATED CIRCUITRY

Element 13 continuously furnishes binary-coded decimal input signals to the coincidence elements 14, 15, and 16 along lines 17, 18, and 19, respectively. As the drum 10 rotates, the different rows of characters pass between the illuminating means 26, 27, and 28 and the windows 30, 31, and 32. Additionally, the code information of each character passes between the light source 29 and the detection means 20. The detection means 20 may be conventional photocells. The light source 29 constantly supplies light. The cleared transparent portions carrying the code information permit light from light source 29 to pass through the drum surface. The detection means 20 detect the light that is passed. As the different codes pass between the light source 29 and the detection means 20, the individual detectors continuously furnish, in different combinations, code signals along lines 21. The cleared transparent portions corresponding to code information are spaced and positioned such that the complete code signal on lines 21 is a binary-coded signal. The code signal is coupled along lines 21 to all three coincidence elements 14, 15, and 16. When the code signal on lines 21 is identical to the binary signal on any of the lines 17, 18, or 19, the coincidence element connected to that line of the lines 17, 18, or 19 supplies a coincidence signal to one of the illuminating means 26, 27, or 28. A coincidence signal is developed by each coincidence element, once during every cycle of the drum 10. The number of coincidence signals developed for any particular input binary singal is dependent upon how long the binary input signal is supplied by element 13. More specifically, as element 13 furnishes the binary equivalent of the number 333, each of the lines 17, 18, and 19 carries a signal corresponding to the binary equivalent of the number 3. Lines 17a and 17b of lines 17 carry a signal, and lines 17c and 17d of lines 17 have no signal. Lines 18a and 18b of lines 18 carry a signal, and lines 18c and 18d of lines 18 have no signal. Lines 19a and 19b of lines 19 carry a signal, and lines 19c and 19d of lines 19 have no signal. As the row of 3's passes between the illuminating means and the windows, detectors 20a and 20b detect the cleared transparent portions on tracks 11a and 12a and supply signals on lines 21a and 21b of lines 21. Since detectors 20c and 20d detect no light, there being no cleared transparent portions on tracks 33 and 34, lines 21c and 21d of lines 21 have no signal. Because all corresponding lines of lines 21 and lines 17, 18, and 19 either carry or do not carry a signal, coincidence elements 14, 15, and 16 supply coincidence signals to illuminating means 26, 27, and 28, respectively. The operation of the coincidence elements will be explained below.

The character appearing behind the particular window of the particular illuminating means that is finally illuminated is the character that is associated with the code information detected which, in turn, corresponds to the binary signal supplied by element 13. In the case described, a number 3 is repetitively view viewed, once during every cycle of the drum 10, in each of the windows 30, 31, and 32. Due to the speed of repetition of the drum, the number 3 is continuously viewed and is not subject to flickering.

As another example, assume the lines 17 carry the number 1 in binary form; the lines 18 carry the number 8 in binary form; and the lines 19 carry the number 5 in binary form. It is, therefore, desirable to read the number 185 through the windows. As the drum rotates, the row of 1's passes between the illuminating means and the windows. The detection means 20 detect the code information corresponding to the number 1 and supply a code signal along lines 21 to coincidence elements 14, 15, and 16. Since element 13 furnishes a binary signal equivalent to the number 1 only along lines 17, only coincidence element 14, at this time, supplies a signal to the illuminating means 26. The number 1 is, therefore, illuminated in window 30. As the drum continues to rotate, the row of 2's passes between the illuminating means and the windows. The detection means 20 detect the code information corresponding to the number 2 and supply a code signal along lines 21 to coincidence elements 14, 15, and 16. Since no binary signal corresponding to the number 2 has been furnished by element 13 along any of the lines 17, 18, and 19, none of the coincidence elements 14, 15, or 16 furnishes a signal to the illuminating means. Therefore, while the row of 2's passes between the illuminating means and the windows, no 2's are illuminated. A similar situation exists while the row of 3's and the row of 4's pass between the illuminating means and the windows. When the row of 5's passes between the illuminating means and the windows, the detection means 20 detect the code information corresponding to the number 5 and supply a code signal along lines 21 to coincidence elements 14, 15, and 16. Since element 13 furnishes a binary signal equivalent to the number 5 along lines 19, only coincidence element 16, at this time, supplies a signal to the illuminating means 28. The number 5 is therefore illuminated in window 32. While the rows of 6's and 7's pass between the illuminating means and the windows, no numbers are illuminated for the same reasons set forth under the conditions while the rows of 2's, 3's, and 4's were passing between the illuminating means and the windows. When the row of 8's passes between the illuminating means and the windows, the detection means 20 detect the code information corresponding to the number 8 and supply a code signal along lines 21 to coincidence elements 14, 15, and 16. Since element 13 furnishes a binary signal equivalent to the number 8 along lines 18, only coincidence element 15, at this time, supplies a signal to the illuminating means 27. The number 8 is therefore illuminated in window 31. While the rows of 9's and 0's pass between the illuminating means and the windows, no numbers are illuminated for the same reasons set forth under the conditions while the rows of 2's, 3's, 4's 6's, and 7's were passing between the illuminating means and the windows.

Therefore, as the drum rotates, the number 1 is illuminated in the window 30 first, the number 5 is illuminated in the window 32 second, and the number 8 is illuminated in the window 31 third. However, due to the speed of rotation of the drum and the high repetition rate of illuminations, it appears to the viewer as if the numbers 1, 8, and 5 were to appear simultaneously.

It is apparent that the number of digits that may be viewed is unlimited. Additional light sources such as 26, 27, and 28 and additional windows such as 30, 31, and 32 may be added and used along with additional coincidence elements such as 14, 15, and 16 if the element 13 furnishes numbers with more than three digits.

Since it takes a finite amount of time for the detection means and the coincidence elements to function, the code information may be offset somewhat so that it is detected a short amount of time prior to the instant that the associated rows of characters pass between the illuminating means and the window. Such offsetting assures the illumination of the illuminating means at the instant the character is behind the window. It is further to be noted that the number of rows of different characters is unlimited. If it is desirable to also include the alphabet and other symbols, a larger drum may be used which can accommodate more characters. However, if the number of characters is increased, additional means for code information must be provided. The present embodiment having four tracks of code information is capable of handling sixteen different codes. If an additional track is provided, the system is capable of handling thirty-two different codes. Therefore, as the number of characters is increased, additional coding tracks are required. Each additional coding track, in turn, requires an additional individual detector. As shown in the present embodiment the detection means is composed of four individual detectors for four coding tracks.

Figure 1C:
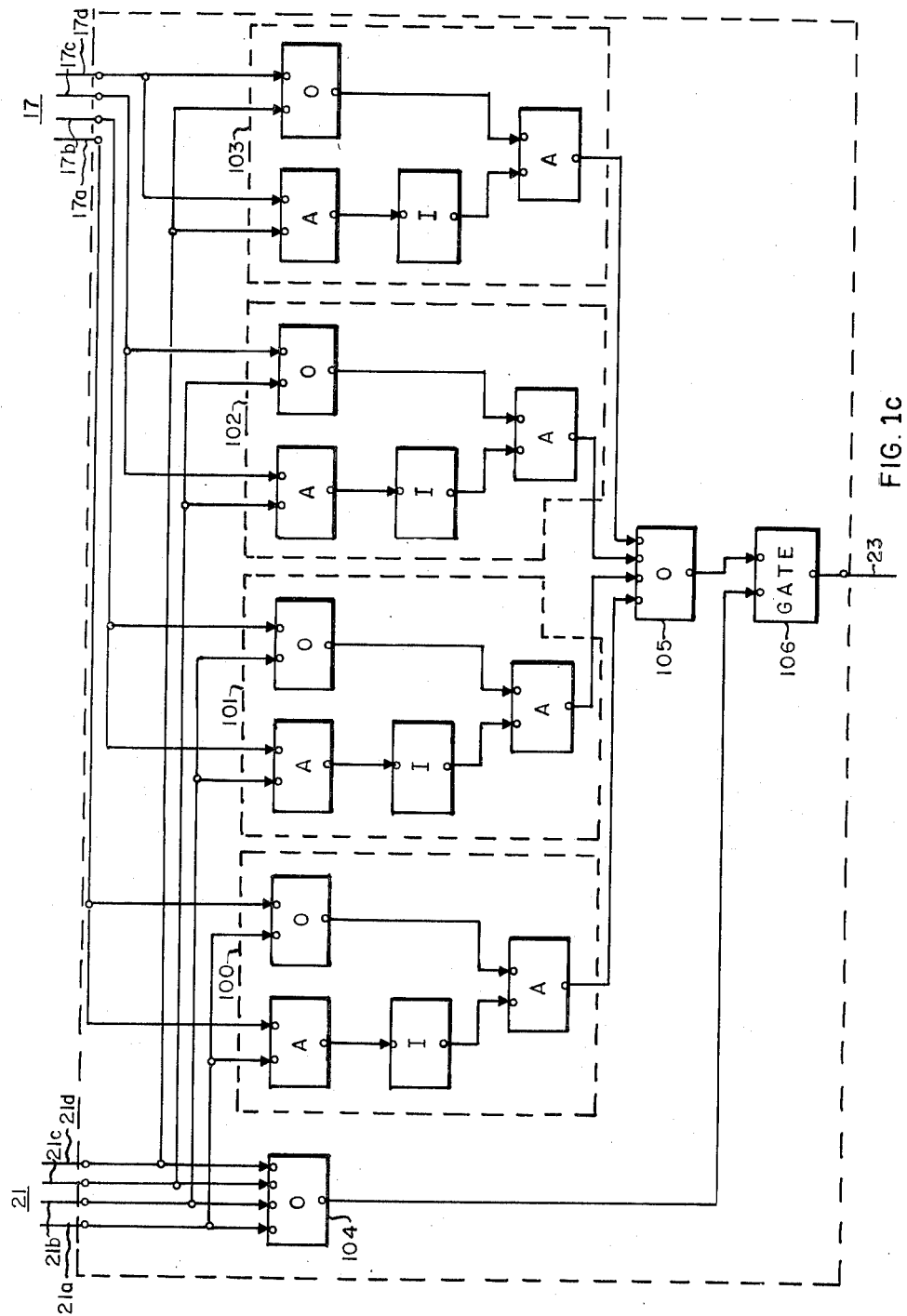
FIG. 1c is a schematic diagram of a coincidence element for use in the present invention.

DESCRIPTION AND OPERATION OF COINCIDENCE ELEMENT OF FIG. 1c

FIG. 1c is a detailed logic diagram of a coincidence element which may be used in the present invention. Elements corresponding to elements of FIG. 1b have been given the same reference numerals. The binary input signal is supplied to coincidence element 14 along lines 17. The code signal is supplied to coincidence element 14 along lines 21. Elements 100, 101, 102, and 103 are conventional half-adders and may be found on page 86 of Arithmetic Operations in Digital Computers, by R. K. Richards. Each of lines 17a, 17b, 17c, and 17d is associated with one of the half-adders. In addition, each of the lines 21a, 21b, 21c, and 21d is similarly associated with one of the half-adders. Each of the lines 21 is also connected to "OR" circuit 104. The "OR" circuits, designated by "O," are of conventional construction. The "AND" circuits, designated by "A," and "INHIBITOR" circuits, designated by "I," which are part of the half-adders, are also of conventional construction. The outputs of the half-adders 100, 101, 102, and 103 are connected to "OR" circuit 105. "OR" circuits 104 and 105 are connected to "GATE" circuit 106. The operation of "GATE" circuit 106 will be explained below.

The operation of coincidence element 14 may most readily be understood by describing two particular examples.

Assume first that the lines 17 carry the binary signal equivalent to the number 9 and that the code signal on lines 21 is also equivalent to the number 9. The lines 17a, 17d, 21a, and 21d carry a signal. The lines 17b, 17c, 21b, and 21c have no signal. With two signals present at the inputs of half-adders 100 and 103, the outputs thereof furnish no signal. With no signals present at the inputs of half-adders 101 and 102, the outputs thereof furnish no signal. Since there are no input signals to "OR" circuit 105, the output thereof furnishes no signal. Because all four lines of lines 21 are connected to "OR" circuit 104, the output thereof will always furnish a signal since there will always be at least one line of the lines 21 carrying a signal. "GATE" circuit 106 is conditioned such that whenever there is no output from "OR" circuit 105, the output of "OR" circuit 104 is allowed to pass through to line 23. Therefore, with identical signals on lines 21 and 17, line 23 has a signal which is coupled to the illuminating means.

As another example, assume that lines 17 still carry the binary signal equivalent to the number 9 but that lines 21 carry a binary signal equivalent to the number 8. The lines 17a, 17d, and 21d carry a signal. The lines 17b, 17c, 21a, 21b, and 21c have no signal. With opposite signals at the inputs of half-adder 100, the output thereof furnishes a signal. Half-adders 101, 102, and 103 respond similarly as described previously since the same conditions exist at the inputs. Due to the input signal to "OR" circuit 105 from the output of half-adder 100, "OR" circuit 105 supplies a signal to "GATE" circuit 106. This signal closes the gate and blocks the passage of the signal from "OR" circuit 104. Line 23, therefore, has no signal.

Whenever the composite signal on lines 17 is identical to the composite signal on lines 21, coincidence element 14 provides a signal along line 23. Whenever the composite signals are not identical, coincidence circuit 14 provides no signal. As previously mentioned, element 13 continuously supplies the input electrical signal for a duration equal to the time desired to view a particular character. It is obvious that a storage arrangement may be built into a coincidence element thereby eliminating the need for continuous supplying of the input signal by element 13.

Figure 2A:
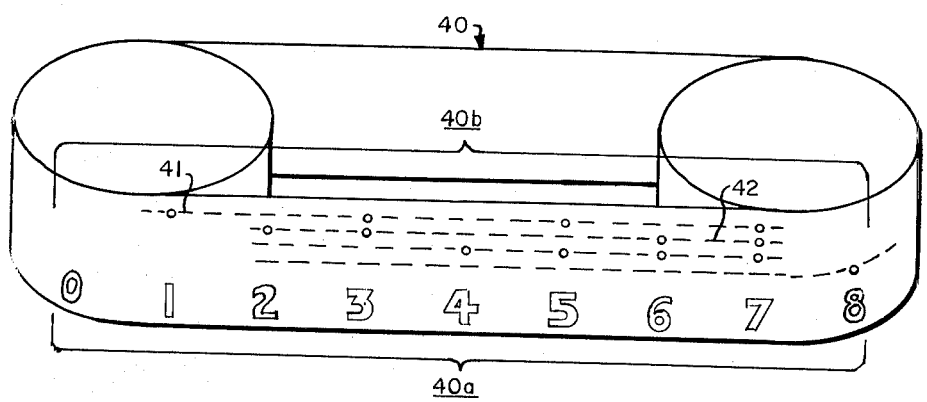
FIG. 2a is a perspective view of a tape-shaped member which carries the characters to be viewed and the code information.

DESCRIPTION OF TAPE OF FIG. 2a

FIG. 2a shows a perspective view of a tape-shaped member 40 which carries the characters to be viewed and the code information. Tape 40 is almost entirely opaque. Portion 40a of the tape has cleared transparent portions corresponding to the characters which are to be viewed. Portion 40b has cleared transparent portions corresponding to the code information. FIG. 2a shows that each character has associated with it a particular code determined by the number of cleared transparent portions and the relative spacing and positioning of these cleared transparent portions. For instance, the character 1 has one cleared portion on track 41. The character 3 has one cleared portion on track 41 and another cleared portion on track 42. The code information of tape 40 serves the same purpose as that of drum 10 previously described.

Figure 2B:
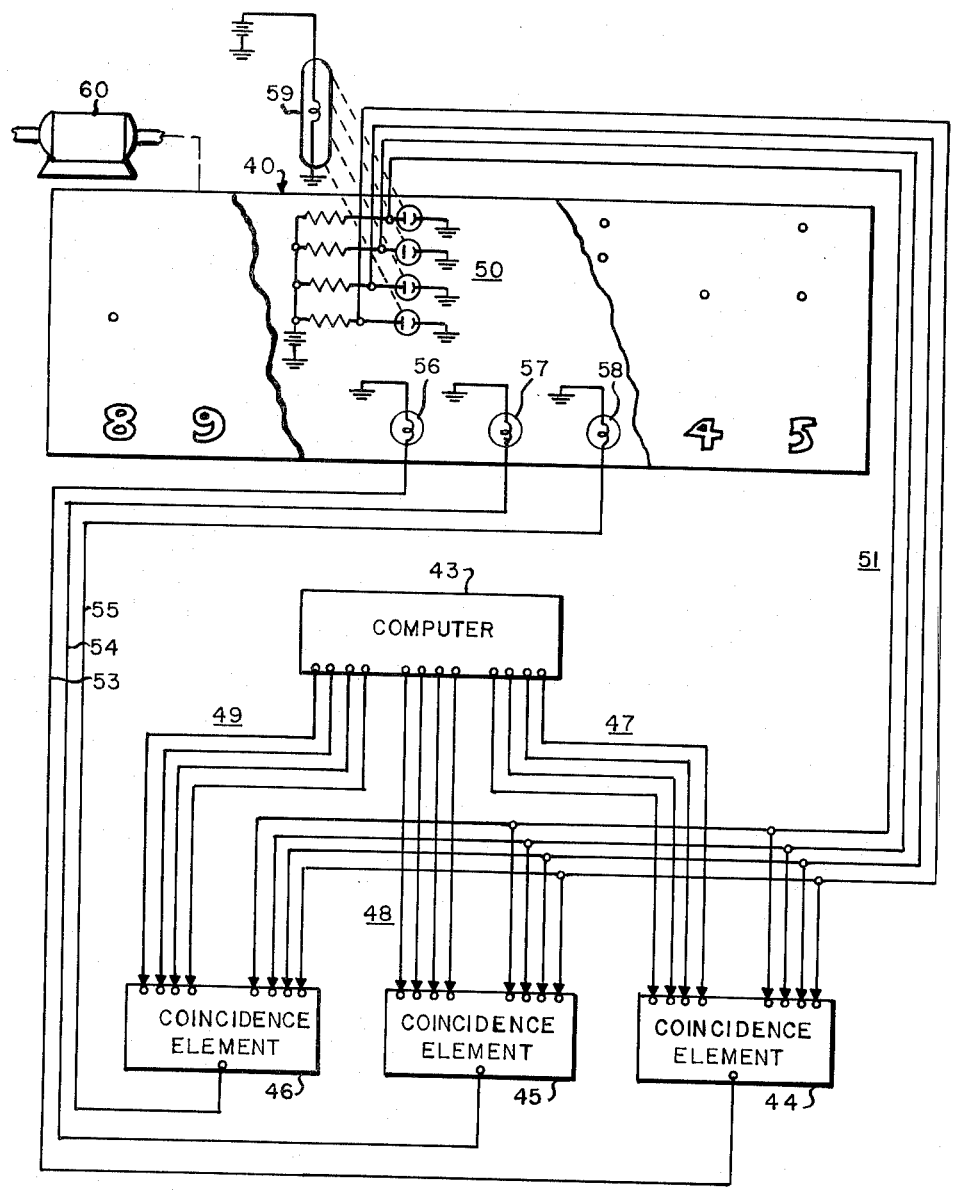
FIG. 2b is a schematic diagram showing the FIG. 2a tape and its associated circuitry.

DESCRIPTION OF TAPE OF FIG. 2b AND ITS ASSOCIATED CIRCUITRY

FIG. 2b is a schematic diagram showing the front view of the FIG. 2a tape and its associated circuitry. The element 43 continuously furnishes binary-coded decimal input signals to the coincidence elements 44, 45, and 46 along lines 47, 48, and 49. The tape 40 is similar to the one described in FIG. 2a. A portion of the tape surface has been cut away so that elements interior to the tape may be seen. A motor 60 causes the tape 40 to continuously rotate at a high speed. A light source 59 is positioned near that portion of the tape which carries the code information and is exterior to the tape. The detection means 50 are located interior to the tape and opposite the light source 59. The detection means 50 are coupled to the coincidence elements 44, 45, and 46 along lines 51. Coincidence elements 44, 45, and 46 are coupled through lines 53, 54, and 55, respectively, to illuminating means 56, 57, and 58, respectively. These illuminating means are located near that portion of the tape which carries the characters to be viewed and are interior to the tape. The viewing windows have been omitted, for the sake of clarity, from FIG. 2b but they would normally be located exterior to the tape and opposite the illuminating means.

OPERATION OF TAPE OF FIG. 2b AND ITS ASSOCIATED CIRCUITRY

The tape and its associated circuitry, as shown in FIG. 2b, operate basically in the same manner as the drum and its associated circuitry, previously described. Element 43 continuously furnishes binary signals to the coincidence elements 44, 45, and 46 along lines 47, 48, and 49, respectively. As the tape rotates, the characters pass in front of the illuminating means 56, 57, and 58. At the time that a particular character passes in front of the illuminating means 56, the detection means 50 detect the corresponding code information which passes between the light source 59 and the detection means and supply the code signal along lines 51 to the coincidence elements 44, 45, and 46. When the code signal on lines 51 is identical to the binary signal on any of the lines 47, 48, and 49, the coincidence element connected to that line of lines 47, 48, or 49 supplies a coincidence signal to one of the illuminating means 56, 57, or 58. Therefore, the character appearing in front of the particular illuminating means that is finally illuminated is the character that is associated with the code information detected which, in turn, corresponds to the binary signal supplied by element 43.

It will be noted, however, that in this embodiment characters appearing in front of illuminating means 57 and 58 are displaced in time from the detection means 50 by one and two counts, respectively. To be more specific, as the number 1 appears in front of illuminating means 56, the number 2 appears in front of illuminating means 57 and the number 3 appears in front of illuminating means 58. These three numbers appear in front of the respective illuminating means simultaneously, yet the detection means 50 only detect the code information associated with the number 1. Accordingly, means must be provided for compensating for the time difference between the time that characters on the tape pass illuminating means 57 and 58 and the time that the code information associated with these characters passes the detection means. One method of providing for this compensation is by modifying the input electrical signals representative of the characters to be viewed in front of illuminating means 57 and 58. For example, if the number 123 is to be viewed, the number 111 must be furnished by the element 43.

As an example, assume the number 124 is to be viewed. As the tape rotates, the number 1 passes in front of the illuminating means 56, and the number 2 passes in front of the illuminating means 57. The detection means 50 detect the code information corresponding to the number 1 and supply a code signal along lines 51 to coincidence elements 44, 45, and 46. Since it is desirable to view the number 1 in front of illuminating means 56 and the number 2 in front of illuminating means 57, coincidence elements 44 and 45 each should supply a signal to illuminating means 56 and 57, respectively. Because the code signal on lines 51 corresponds to a binary equivalent of the number 1, element 43 should furnish a binary signal equivalent to the number 1 on lines 47 and lines 48. As the tape continues to rotate, the number 2 appears in front of illuminating means 56; the number 3 appears in front of illuminating means 57; and the number 4 appears in front of illuminating means 58. The detection means 50 detect the code information corresponding to the number 2 and supply a code signal along lines 51 to coincidence elements 44, 45, and 46. Since it is desirable to view a 4 in front of illuminating means 58, coincidence element 46 should supply a signal to illuminating means 58. Because the code signal on lines 51 corresponds to a binary equivalent of the number 2, element 43 should furnish a binary signal equivalent to the number 2 on lines 49.

It is seen that if a particular number is to be viewed, a different number is to be furnished by the element 43. The relationship between the number to be viewed and the number to be furnished by element 43 may be explained by the following expression:

| Number To Be Viewed | | | Number To Be Furnished | | |
|---|---|---|---|---|---|
| 1st Digit | 2nd Digit | 3rd Digit | 1st Digit | 2nd Digit | 3rd Digit |
| A | B | C | A | B-1 | C-2 |

As previously mentioned, element 43 may be considered as a computer. There may be built within this computer a piece of equipment composed of conventional subtractors which modifies the desired information in such a way that the readout device presently being described may be employed. More specifically, this piece of equipment may modify the information as explained in the above expression. It is to be noted that the detection means 50 may be located at any point and that once the relative positioning between the detection means and the particular window is determined, the answer to be read out may be modified accordingly.

Consider the situation wherein the computer has solved a problem and the answer is the number 185. After this number is modified in accordance with the above explanation, the lines 47 continuously carry the number 1 in binary form; the lines 48 continuously carry the number 7 in binary form; and the lines 49 continuously carry the number 3 in binary form. As the tape rotates, the number 1 passes in front of the illuminating means 56. The detection means 50 detect the code information corresponding to the number 1 and supply a code signal along lines 51 to coincidence elements 44, 45, and 46. Since element 43 furnishes a binary signal equivalent to the number 1 only along lines 47, only coincidence element 44, at this time, supplies a signal to the illuminating means 56. The number 1 is, therefore, illuminated. As the tape continues to rotate, the number 2 passes in front of the illuminating means 56. The detection means 50 detect the code information corresponding to the number 2 and supply a code signal along lines 51 to coincidence elements 44, 45, and 46. Since no binary signal equivalent to the number 2 has been furnished by element 43 along any of the lines 47, 48, and 49, none of the coincidence elements 44, 45, or 46 furnishes a signal to the illuminating means. Therefore, at this time no numbers are illuminated. As the tape continues to rotate, the numbers 3, 4, and 5 pass in front of illuminating means 56, 57, and 58, respectively. The detection means 50 detect the code information corresponding to the number 3 and supply a code signal along lines 51 to coincidence elements 44, 45, and 46. Since element 43 furnishes a binary signal equivalent to the number 3 only along lines 49, only coincidence element 46, at this time, supplies a signal to the illuminating means 58. The number 5, being in front of illuminating means 58, is therefore illuminated. As the tape continues to rotate, no numbers are illuminated until the numbers 7, 8, and 9 pass in front of the illuminating means 56, 57, and 58, respectively. This becomes obvious since in this interim the numbers 4, 5, and 6, while passing in front of illuminating means 56, have their corresponding code information detected. Since the element 43 furnishes no binary signals equivalent to numbers 4, 5, or 6, no signals are supplied by coincidence elements 44, 45, and 46 to the illuminating means 56, 57, or 58. While the numbers 7, 8, and 9 pass in front of illuminating means 56, 57, and 58, respectively, detection means 50 detect the code information corresponding to the number 7 and supply a code signal along lines 51 to the coincidence elements 44, 45, and 46. Since element 43 furnishes a binary signal equivalent to the number 7 only along lines 48, only coincidence element 45, at this time, supplies a signal to the illuminating means 57. The number 8, being in front of illuminating means 57, is therefore illuminated.

Therefore as the tape rotates, the number 1 is illuminated first; the number 5 is illuminated second; and the number 8 is illuminated third. However, due to the speed of rotation of the tape and the high repetition rate of illuminations, it appears to the viewer as if the numbers 1, 8, and 5 were to appear simultaneously. The desired number 185 is therefore viewed.

Again, it is apparent that this embodiment of the invention is not limited to the viewing of only three characters. Additional light sources such as 56, 57, and 58 may be added and used along with additional coincidence elements such as 44, 45, and 46 if the element 43 furnishes numbers with more than three digits.

Since it takes a finite amount of time for the detection means and the coincidence elements to function, the code information may be offset somewhat so that it is detected a short amount of time prior to the instant that the associated rows of characters pass between the illuminating means and the window. Such offsetting assures the illumination of the illuminating means at the instant the character is behind the window.

It is further to be noted that the number of characters is unlimited. If it is desirable to also include the alphabet and other symbols, a larger tape may be used which can accommodate more characters. As the number of different characters is increased, additional means must be provided for code information. The present embodiment, having four tracks of code information, is capable of handling sixteen different codes. If an additional track is provided, the device is capable of handling thirty-two different codes. It is, therefore, apparent that as the number of different characters is increased, additional coding tracks are required. Each additional coding track, in turn, requires an additional detector. As shown in the present embodiment, the detector means is composed of four individual detectors for four coding tracks.

Figure 3A:
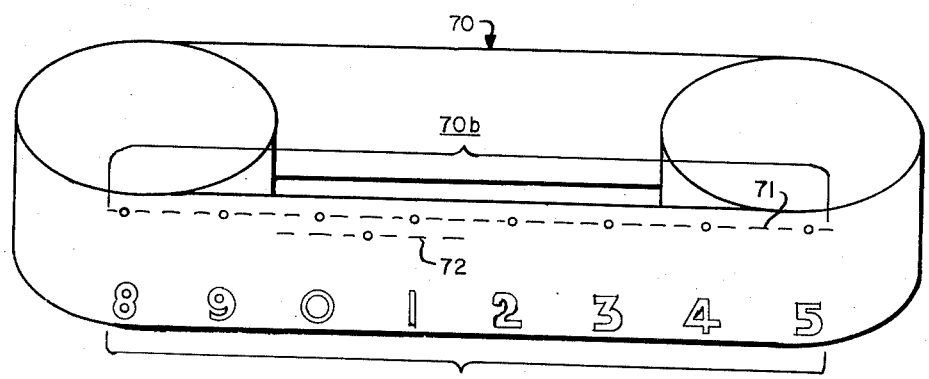
FIG. 3a is a perspective view of a second tape-shaped member which carries the characters to be viewed and the code information.

*Description of tape of FIG. 3a*

FIG. 3a shows a perspective view of a second tape-shaped member 70 which carries the characters to be viewed and the code information. Tape 70 is almost entirely opaque. Portion 70a of the tape has cleared transparent portions corresponding to the characters which are to be viewed. Portion 70b has cleared transparent portions corresponding to the code information. FIG. 3a shows that each character has associated with it a cleared transparent portion on track 71. Track 72 has one cleared transparent portion positioned laterally between the characters 0 and 1. This cleared transparent portion will hereinafter be referred to as the sync code.

Figure 3B:
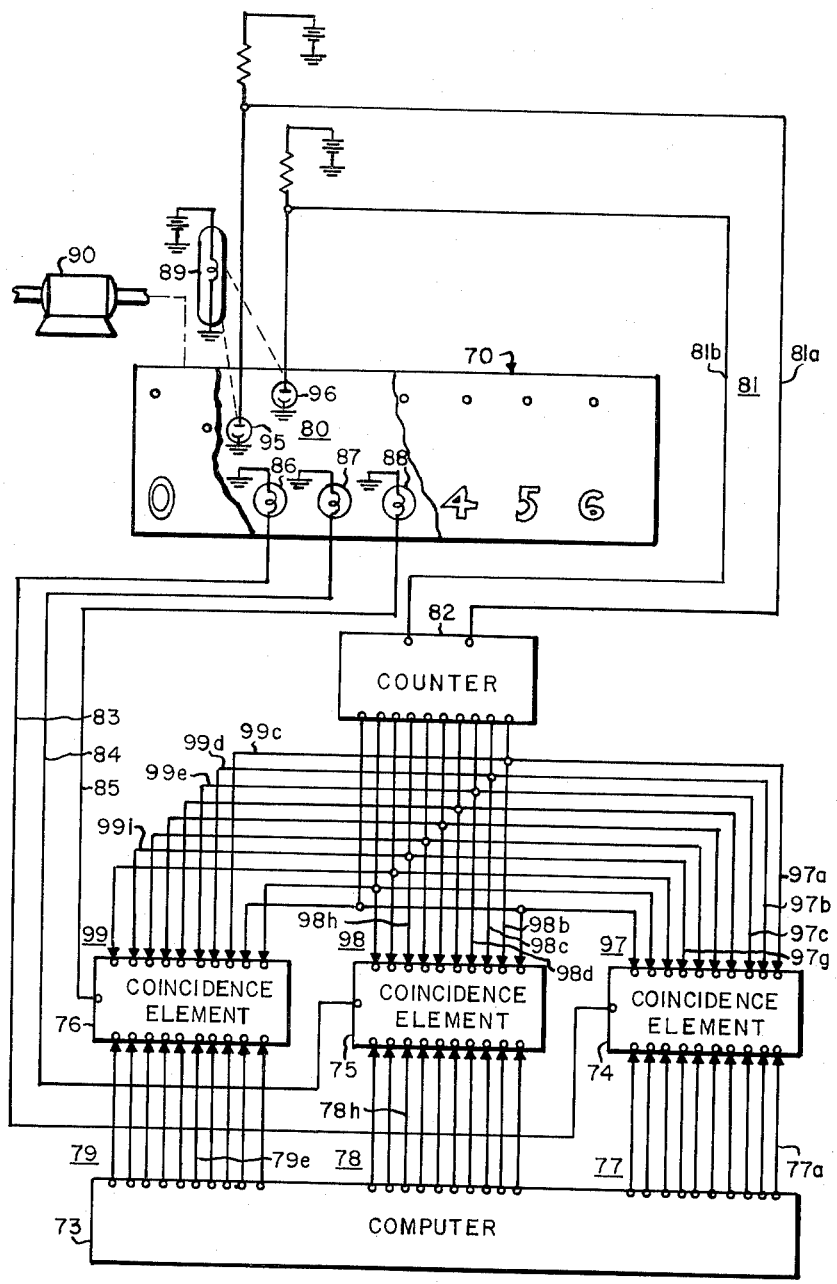
FIG. 3b is a schematic diagram showing the FIG. 3a tape and its associated circuitry.

DESCRIPTION OF TAPE OF FIG. 3b AND ITS ASSOCIATED CIRCUITRY

FIG. 3b is a schematic diagram showing the front view of the FIG. 3a tape and its associated circuitry. The element 73 continuously furnishes decimal-coded input signals to the coincidence elements 74, 75, and 76 along lines 77, 78, and 79. A portion of the tape surface 70 has been cut away so that elements interior to the tape may be seen. A motor 90 causes tape 70 to continuously rotate at a high speed. A light source 89 is positioned near that portion of the tape which carries the code information. Detection means 80 are also located interior to the tape and opposite the light source 89. Detector 95 is located near that portion of the tape that carries the sync code. Detector 96 is located near that portion of the tape that carries the code associated with each character. Detectors 95 and 96 are coupled to counter 82 through lines 81. Coincidence elements 74, 75, and 76 are coupled to counter 82 through lines 97, 98, and 99. Coincidence elements 74, 75, and 76 are coupled through lines 83, 84, and 85, respectively, to illuminating means 86, 87, and 88, respectively. These illuminating means are located near that portion of the tape which carries the characters to be viewed and are interior to the tape. The viewing windows have been omitted, for the sake of clarity, in FIG. 3b, but they would normally be located exterior to the tape and opposite to the illuminating means.

OPERATION OF TAPE OF FIG. 3b AND ITS ASSOCIATED CIRCUITRY

The operation of the FIG. 3b tape may most easily be understood if, at the outset, a cycle of operation is explained.

As the tape rotates, the characters pass in front of the illuminating means 86, 87, and 88. Additionally, the code information passes between the light source 89 and the detection means 80. After the character 0 passes the illuminating means 86, the detector 95 detects the cleared transparent portion corresponding to the sync code. The signal developed by detector 95 is supplied along line 81a and resets the counter 82 to the starting position. Counter 82 is a conventional electronic counter. As the number 1 passes in front of illuminating means 86, the detector 96 detects the first cleared transparent portion appearing above the character 1, and a signal is supplied along line 81b to the counter 82. At this time the counter 82 supplies signals along line 97a of lines 97 to coincidence element 74, along line 98b of lines 98 to coincidence element 75, and along line 99c of lines 99 to coincidence element 76. The remaining lines of lines 97, 98, and 99 have no signal. Coincidence elements 74, 75, and 76 supply a signal along lines 83, 84, and 85, respectively, whenever corresponding lines of lines 77 and 97 carry signals, corresponding lines of lines 78 and 98 carry signals, and corresponding lines of lines 79 and 99 carry signals. More specifically, if lines 97a and 77a both have signals, coincidence element 74 supplies a signal. As the tape continues to rotate, the number 2 passes in front of illuminating means 86. As the detector 96 detects the second cleared transparent portion, a second signal is supplied along line 81b to the counter 82. At this time counter 82 supplies signals along the line 97b of lines 97 to coincidence element 74, along line 98c of lines 98 to coincidence element 75, and along line 99d of lines 99 to coincidence element 76. As each subsequent cleared transparent portion is detected by detector 96, the signal from the counter 82 is transferred to the next lowest lines of the lines 97, 98, and 99. It will be noticed that at any particular instant the signal on any particular line of lines 99 is two lines lower than the signal on the line of lines 97, and the signal on a line of lines 98 is one line lower than the signal on the line of lines 97. Since the characters appearing in front of illuminating means 87 and 88 are displaced in time from the detector 96 by one and two counts, respectively, means are also provided in this embodiment for compensating for the time difference between the time that characters on the tape pass illuminating means 87 and 88 and the time that the code infromation associated with these characters passes the detection means. Here, however, the code signals are in effect being modified since the relative positions of the bits on the lines running between the counter 82 and the coincidence elements 97, 98 and 99 are being altered. It is for this reason that the lines 97, 98, and 99 are connected in the manner indicated.

Assume the lines 77a, 78h, and 79e of lines 77, 78, and 79, respectively, continuously carry a signal. Lines 77 carry a signal equivalent to the number 1 in decimal form since line 77a, being the first line of the group, carries a signal. Lines 78 carry a signal equivalent to the number 8 in decimal form since line 78h, being the eighth line of the group, carries a seignal. Lines 79 carry a signal equivalent to the number 5 in decimal form since line 79e, being the fifth line of the group, carries a signal.

As the sync code passes between light source 89 and detector 95, the counter 82 is reset. As the number 1 passes in front of illuminating means 86, the first cleared transparent portion passes between the light source 89 and the detector 96. Detector 96 detects the code, and a code signal is supplied along line 81b to counter 82. As previously mentioned, the counter supplies a signal to lines 97a, 98b, and 99c of lines 97, 98, and 99 respectively. Since the lines 97a and 77a both carry a signal, coincidence element 74 supplies a signal along line 83 to illuminating means 86. The number 1 is therefore illuminated. Because the lines 98h and 99e have no signal, neither of the coincidence elements 75 nor 76 furnishes a signal to illuminating means 87 or 88. As the number 2 passes in front of illuminating means 86, the second cleared transparent portion passes between the light source 89 and the detector 96. Detector 96 detects the code, and a code signal is supplied along line 81b to counter 82. The counter supplies a signal to lines 97b, 98c, and 99d of lines 97, 98, and 99, respectively. Because the lines 97a, 98h, and 99e have no signal, none of the coincidence elements 74, 75, or 76 furnishes a signal to the illuminating means 86, 87, or 88. As the number 3 passes in front of illuminating means 86, the third cleared transparent portion passes between the light source 89 and the detector 96. While the number 3 passes in front of illuminating means 86, the numbers 4 and 5 pass in front of illuminating means 87 and 88, respectively. Detector 96 detects the code appearing above the number 3, and a code signal is supplied along lines 81b to the counter 82. The counter supplies a signal to lines 97c, 98d, and 99e of lines 97, 98, and 99, respectively. Since the lines 99e and 79e both carry a signal, coincidence element 76 supplies a signal along line 85 to illuminating means 88. The number 5 is therefore illuminated. Because the lines 97a and 98h have no signal, neither of the coincidence elements 74 nor 75 furnishes a signal to illuminating means 86 or 87. As the numbers 4, 5, and 6 pass in front of illuminating means 86, detector 96 continues to detect the code, and the signals are transferred to the next lowest lines of lines 97, 98, and 99. During this interim none of the coincidence elements 74, 75, and 76 furnishes a signal to the illuminating means 86, 87, and 88, respectively, since the signals supplied to lines 97, 98, and 99 are not on the particular lines corresponding to the lines upon which signals are supplied on lines 77, 78, and 79. As the number 7 passes in front of the illuminating means 86, the seventh cleared portion passes between the light source 89 and the detector 96. While the number 7 passes in front of illuminating means 86, the numbers 8 and 9 pass in front of illuminating means 87 and 88, respectively. Detector 96 detects the code appearing above the number 7, and a code signal is supplied along line 81b to counter 82. The counter supplies a signal to lines 97g, 98h, and 99i of lines 97, 98, and 99, respectively. Since the lines 98h and 78h both carry a signal, coincidence element 75 supplies a signal along line 84 to illuminating means 87. The number 8 is therefore illuminated. Because the lines 97a and 99e have no signal, neither of the coincidence elements 74 nor 76 furnishes a signal to illuminating means 86 or 88.

Therefore, as the tape rotates, the number 1 is viewed first; the number 5 is viewed second; and the number 8 is viewed third. However, due to the speed of rotation of the tape and the high repetition rate of illuminations, it appears to the viewer as if the numbers 1, 8, and 5 were to appear simultaneously. The desired number 185 is therefore viewed.

Again, it is apparent that this embodiment of the invention is not limited to the viewing of only three characters. Additional light sources such as 86, 87 and 88 may be added and used along with additional storage elements such as 74, 75, and 76 if the element 73 furnishes numbers with more than three digits.

Since it takes a finite amount of time for the detection means and the coincidence elements to function, the code information may be offset somewhat so that it is detected a short amount of time prior to the instant that the associated rows of characters pass between the illuminating means and the window. Such offsetting assures the illumination of the illuminating means at the instant the character is behind the window.

It is further to be noted that the number of characters is unlimited. If it is desirable to also include the alphabet and other symbols, a larger tape may be used which can accommodate more characters. As the number of different characters is increased, additional means must be provided for code information. With each additional character, an additional cleared portion must be provided.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A readout device comprising: circuit means for continuously supplying a plurality of input signals at the same time, each of said signals representative of a particular character; a tape having cleared portions carrying displayable characters represented by said input signals and other portions carrying code information associated with each character; a plurality of viewing positions, one for each character to be displayed, for simultaneously displaying all the characters represented by said input electrical signals supplied at the same time; means for repetitively moving said tape sequentially past all of said viewing positions so that each displayable character on the tape is sequentially moved past each viewing positions; code detection means responsive to said code information for continuously developing electrical code signition; code detection means responsive to said code information as said tape moves, said code detection means so positioned that when a particular code on said tape passes said code detection means the character associated with said particular code passes a selected viewing position, while at the same time, other characters pass the other viewing positions; a plurality of circuit means, one associated with each of said viewing positions, and each jointly responsive to said code signals and the input electrical signal representative of the character to be viewed in the associated viewing position, for developing control signals whenever a particular code signal is representative to code information associated with the same character as the character represented by said input electrical signal; means responsive to said control signals for repetitively making visible, during every cycle of said tape, the particular characters on said tape represented by said input electrical signals; and means for compensating for the time difference between the time that characters on said tape pass viewing positions other than said selected one and the time the code information associated with these characters passes said code detection means.

2. A readout device comprising: circuit means for continuously supplying a plurality of input signals at the same time, each of said signals representative of a particular character; a tape having cleared portions carrying displayable characters represented by said input signals and other portions carrying code information associated with each character; a plurality of viewing positions, one for each character to be displayed, for simultaneously displaying all the characters represented by said input electrical signals supplied at the same time; means for repetitively moving said tape sequentially past all of said viewtape is sequentially moved past each viewing position; tape is sequentially moved past each viewing positions; code detection means responsive to said code information for continuously developing electrical code signals, one at a time, representative of said code information as said tape moves, said code detection means so positioned that when a particular code on said tape passes said code detection means, the character associated with said particular code passes a selected viewing position, while at the same time, other characters pass the other viewing positions; a plurality of circuit means, one associated with each of said viewing positions, and each jointly responsive to said code signals and the input electrical signal representative of the character to be viewed in the associated viewing position, for developing control signals whenever a particular code signal is representative of code information associated with the same character as the character represented by said input electrical signal; means responsive to said control signals for repetitively making visible, during every cycle of said tape, the particular characters on said tape represented by said input electrical signals; and means for modifying said input electrical signals to compensate for the time difference between the time that characters on said tape pass viewing positions other than said selected one and the time the code information associated with these characters passes said code detection means.

3. A readout device comprising: circuit means for continuously supplying a plurality of input signals at the same time, each of said signals representative of a particular character; a tape having cleared portions carrying displayable characters represented by said input signals and other portions carrying code information associated with each character; a plurality of viewing positions, one for each character to be displayed, for simultaneously displaying all the characters represented by said input electrical signals supplied at the same time; means for repetitively moving said tape sequentially past all of said viewing positions so that each displayable character on the tape is sequentially moved past each viewing position; code detection means responsive to said code information for continuously developing electrical code signals, one at a time, representative of said code information as said tape moves, said code detection means so positioned that when a particular code on said tape passes said code detection means, the character associated with said particular code passes a selected viewing position, while at the same time, other characters pass the other viewing positions; a plurality of circuit means, one associated with each of said viewing positions, and each jointly responsive to said code signals and the input electrical signal representative of the character to be viewed in the associated viewing position, for developing control signals whenever a particular code signal is representative of code information associated with the same character as the character represented by said input electrical signal; means responsive to said control signals for repetitively making visible, during every cycle of said tape, the particular characters on said tape represented by said input electrical signals; and means for modifying said code signals to compensate for the time difference between the time that characters on said tape pass viewing positions other than said selected one and the time the code information associated with these characters passes said code detection means.

4. A readout device comprising: means for continuously supplying a plurality of input signals at the same time, each of said signals representative of a particular character; a plurality of illuminating means arranged in a line; an opaque member having a line of characters in the form of light transmissive apertures along the length of said member; means for repetitively moving said line of characters sequentially past each of said plurality of illuminating means, so that each displayable character on the tape is sequentially moved past all of the illuminating means; position indicating means for providing electrical signals indicative of the position of said opaque member relative to said illuminating means so as to indicate when a particular character is in proximity to a particular one of said illuminating means; circuit means jointly responsive to said electrical signals indicative of the position of said opaque member and said input signals representative of the characters for developing during each cycle of said opaque member a control signal whenever there is a correspondence between said input signals representative of the characters and said signals indicative of the position of said opaque member; and means to render said plurality of illuminating means responsive to said control signals so as to illuminate during each cycle of said moving member the particular characters on said opaque member represented by said input signals.

5. A readout device comprising: means for continuously supplying a plurality of input signals at the same time, each of said signals representative of a particular character; a plurality of illuminating means arranged in a line; an opaque member having a line of characters in the form of light transmissive apertures along the length of said member; means for repetitively moving said line of characters sequentially past each of said plurality of illuminating means, so that each displayable character on the tape is sequentially moved past all of the illuminating means; position indicating means for providing electrical signals indicative of the position of said opaque member relative to said illuminating means so as to indicate when a particular character is in proximity to a particular one of said illuminating means; a plurality of circuit means, one associated with each of said illuminating means and each jointly responsive to said electrical signals indicative of the proximity of said characters with respect to each illuminating means and said input signals representative of the characters for developing during each cycle of said opaque member a control signal whenever there is a correspondence between said signals indicative of the proximity of said characters with respect to each illuminating means and said input signals representative of the characters; and means to render said plurality of illuminating means responsive to said control signals so as to illuminate during each cycle of said moving member the particular characters on said opaque member represented by said input signals.

References Cited by the Examiner

UNITED STATES PATENTS

| | | | |
|---|---|---|---|
| 2,240,544 | 5/1941 | Bryce | 340—149.1 |
| 2,510,485 | 6/1950 | Vossberg | 340—318 |
| 2,633,297 | 3/1953 | Quinby et al. | 340—307 X |
| 2,666,911 | 1/1954 | Reynolds | 340—318 X |
| 2,714,841 | 8/1955 | Demer et al. | 340—318 |
| 2,726,940 | 12/1955 | Buhler | 340—149.1 |
| 2,739,304 | 3/1956 | John | 340—318 |
| 2,745,092 | 5/1956 | Moorehead et al. | 340—318 |
| 2,775,172 | 12/1956 | Higonnet et al. | 340—149.1 |
| 2,787,199 | 4/1957 | Higonnet et al. | 340—149.1 |

OTHER REFERENCES

IBM Technical Disclosure Bulletin, page 27, "Opto-Electromechanical Digital Positions Comparator," vol. 1, No. 1, June 1958.

NEIL C. READ, *Primary Examiner.*

STEPHEN W. CAPELLI, *Examiner.*

UNITED STATES PATENT OFFICE
CERTIFICATE OF CORRECTION

Patent No. 3,222,666 December 7, 1965

Andrew R. Hallden

It is hereby certified that error appears in the above numbered patent requiring correction and that the said Letters Patent should read as corrected below.

Column 2, line 50, for "letectors" read -- detectors --; column 3, line 49, strike out "view"; column 10, lines 12 and 13, for "infromation" read -- information --; line 26, for "seignal" read -- signal --; column 11, line 63, for "all" read -- each --; line 65, for "each" read -- all --; same column 11, lines 68 and 69, for "tion; code detection means responsive to said code intion" read -- nals, one at a time, representative of said code information --; column 12, line 5, for "to" read -- of --; lines 25 and 26, for "all of said viewtape is sequentially moved past each viewing position;" read -- all of said viewing positions so that each displayable character on the --; line 27, for "each" read -- all --; line 63, for "all" read -- each --; line 65, for "each" read -- all --; same column 12, same line 65, for "position" read -- positions --.

Signed and sealed this 17th day of January 1967.

(SEAL)
Attest:

ERNEST W. SWIDER
Attesting Officer

EDWARD J. BRENNER
Commissioner of Patents